(12) United States Patent
Ichikawa

(10) Patent No.: US 6,850,271 B1
(45) Date of Patent: Feb. 1, 2005

(54) PHOTOGRAPHIC APPARATUS

(75) Inventor: Koji Ichikawa, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 886 days.

(21) Appl. No.: 09/589,880

(22) Filed: Jun. 9, 2000

(30) Foreign Application Priority Data

Jun. 11, 1999 (JP) ............................................ 11-165335

(51) Int. Cl.$^7$ ............................................ H04N 5/225
(52) U.S. Cl. .............................. 348/207.2; 348/223.1; 348/254
(58) Field of Search ........................ 348/223.1, 207.2, 348/231.99, 231.7, 254; 386/95

(56) References Cited

U.S. PATENT DOCUMENTS

| | | | |
|---|---|---|---|
| 5,610,726 A | * | 3/1997 | Nonoshita et al. .......... 358/442 |
| 6,020,982 A | * | 2/2000 | Yamauchi et al. .......... 358/444 |
| 6,115,137 A | * | 9/2000 | Ozawa et al. ................ 358/1.6 |
| 6,421,083 B1 | * | 7/2002 | Takakura .................. 348/223.1 |

FOREIGN PATENT DOCUMENTS

| | | | |
|---|---|---|---|
| JP | 6-8537 | 1/1994 | ............... B41J/5/30 |
| JP | 6-189261 | 7/1994 | ............ H04N/5/92 |

* cited by examiner

Primary Examiner—Tuan Ho
Assistant Examiner—Heather R. Long
(74) Attorney, Agent, or Firm—Sughrue Mion, PLLC

(57) ABSTRACT

White balance correction amounts are read from a region in which white balance correction amounts are recorded in a region in which print information is recorded in a smart media. An overall white balance correction average value is computed. From the white balance correction average value, an AWB additional control amount which is to be additionally corrected at a digital still camera is computed. A current AWB additional control amount and the above AWB additional control amount are multiplied to determined a new AWB additional correction amount which is set in the camera. Similarly, a correction circuit, a γ conversion circuit, a YCrCb matrix circuit, and a contour correction circuit are set on the basis of a brightness correction amount, a gradation correction amount, a tint correction amount, and a contour correction amount.

17 Claims, 7 Drawing Sheets

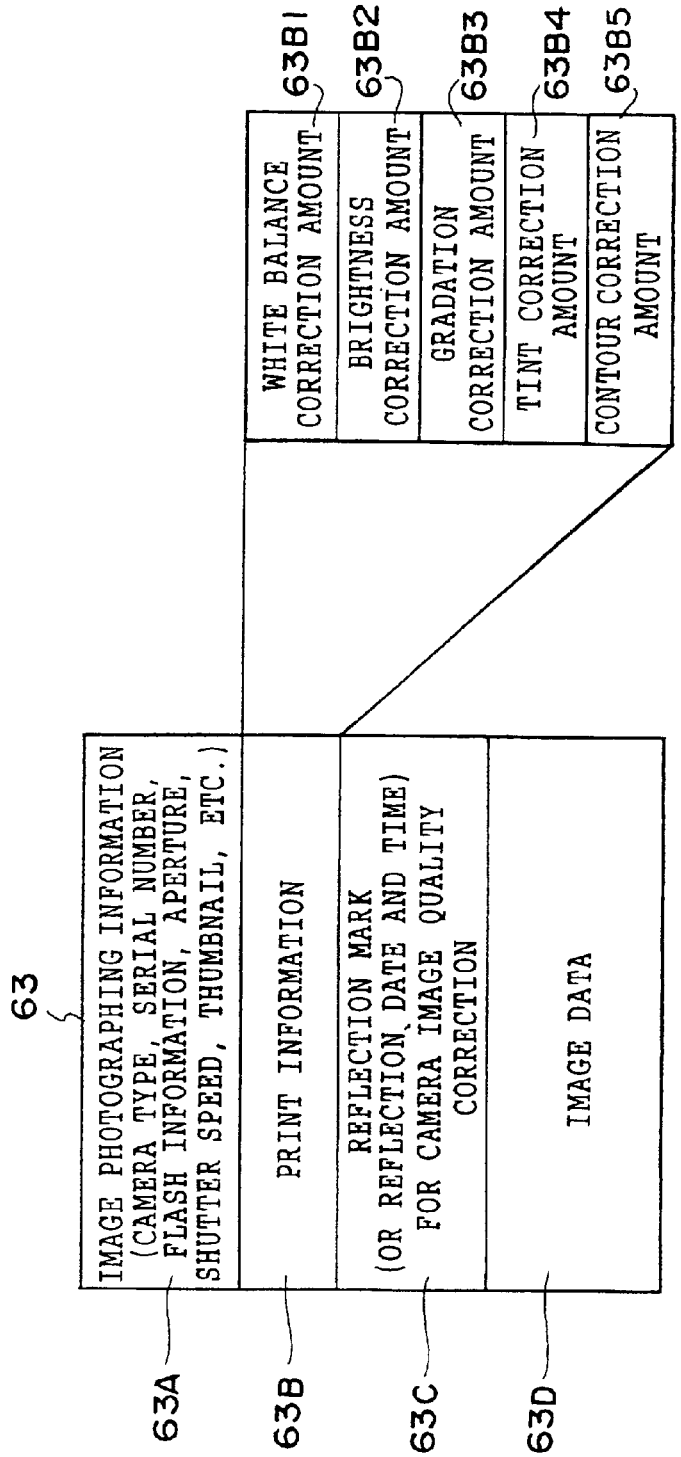

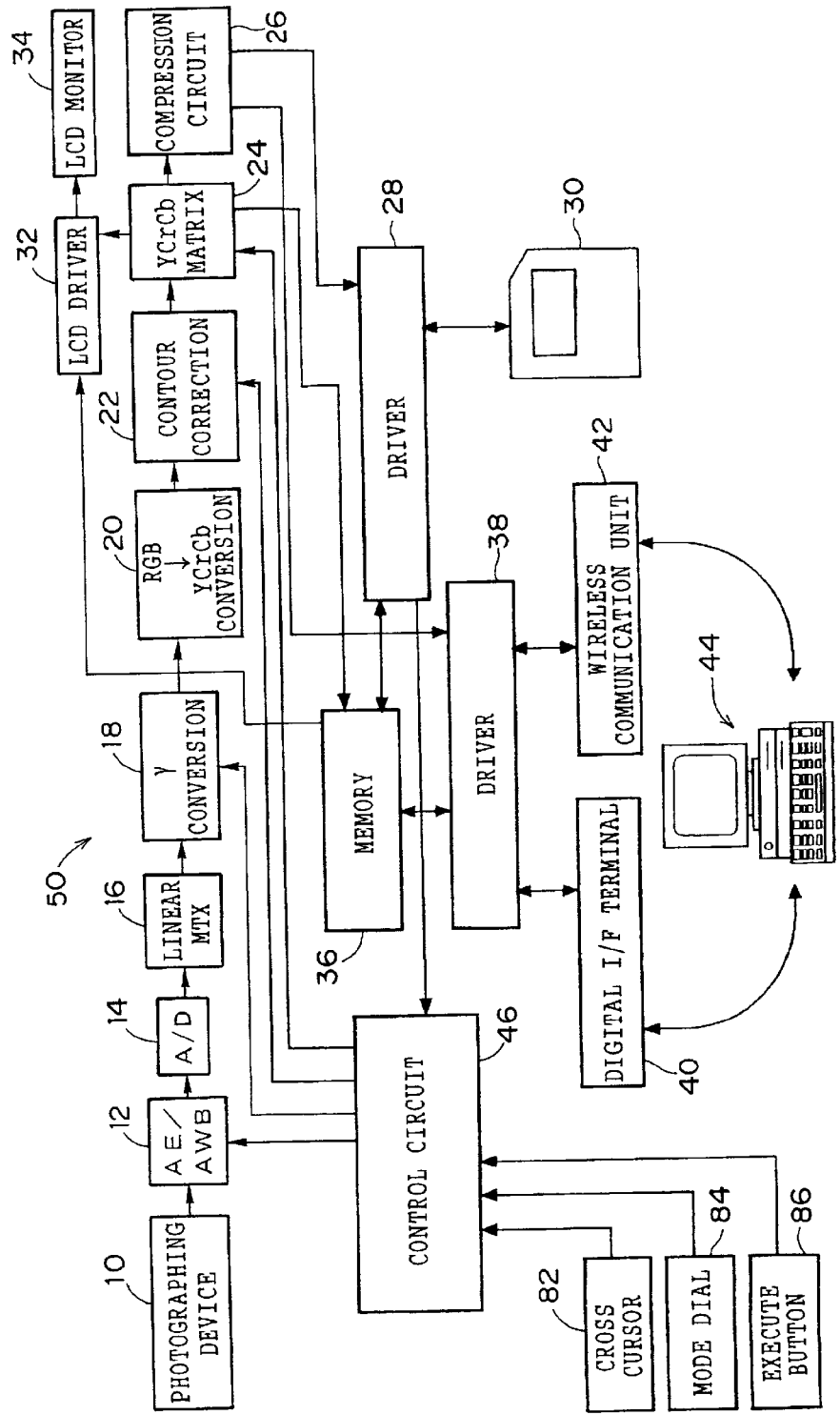

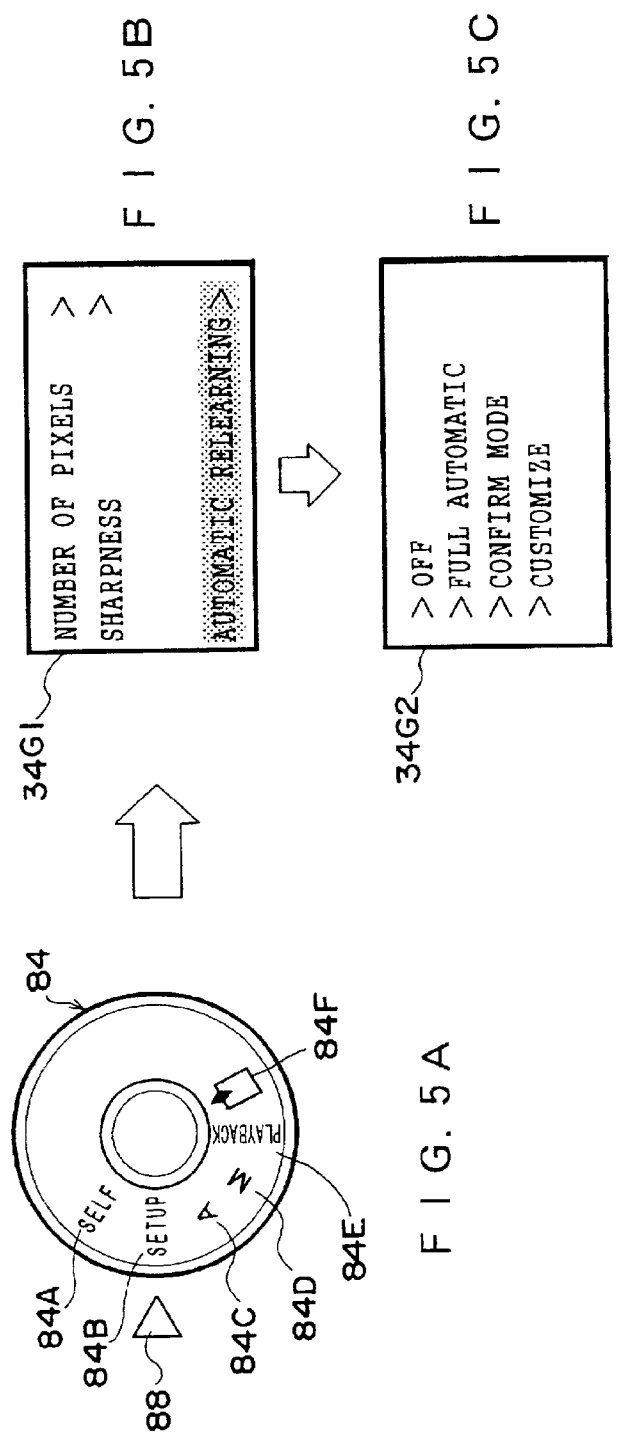

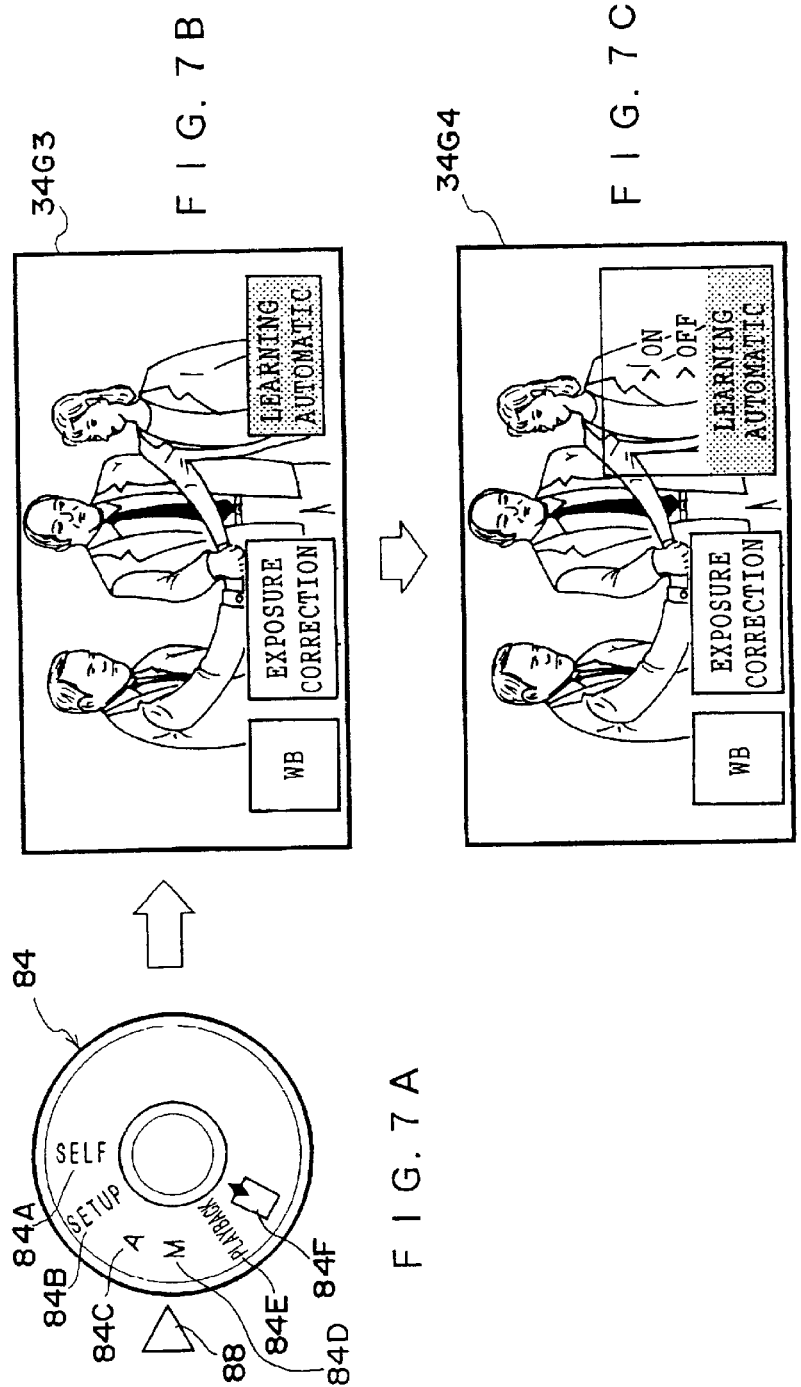

PHOTOGRAPHIC APPARATUS

BACKGROUND OF THE INVENTION

1. Field of the Invention

The present invention relates to a photographing apparatus, and in particular, to a photographing apparatus which corrects image information obtained by photographing a subject.

2. Description of the Related Art

Conventionally, when a printer is to print digital image data which is outputted from an image input device such as a digital still camera or the like, in order to obtain a finished print in which the image is of an appropriate quality (color, gradation, sharpness), automatic image quality correction processing (printer auto setup) is carried out within the printer. Conventional printers are equipped with functions which permit manual image quality adjustment, in order for the user to obtain finished prints of an image quality which suits his/her tastes.

However, it is troublesome for the user to carry out manual image quality adjustment each time printing is to be carried out.

Further, phenomena which result in a deterioration in the image quality, such as loss in gradation detail in bright areas, S/N deterioration, and the like tend to occur in print auto-setup and manual image quality adjustment which are carried out at a printer.

Japanese Patent Application Laid-Open (JP-A) No. 6-189261 discloses a digital electronic still camera equipped with an added information recording/playback circuit which records and plays back added information such as information regarding the number of pixels of the CCD being used, the conversion characteristic of the A/D converter, the method of compressing the digital image, characteristic information regarding γ correction, and the like. When the release is operated, image information is written onto an optical disc, and when writing of the image information is completed, the added information is recorded onto the optical disc.

Further, JP-A-6-8537 discloses a printer system in which image data and image playback information (the tint, brightness, sharpness, contrast and the like when the image is printed) corresponding to the image data are recorded on a memory card. At the printer, the image data and image playback information are read from the memory card, the image information is corrected on the basis of the image playback information, and an image is printed out.

In both of these apparatuses, image quality correction is carried out at the printer. Therefore, phenomena resulting in a deterioration in image data, such as loss in gradation detail in bright areas, S/N deterioration, and the like, tend to occur.

SUMMARY OF THE INVENTION

The present invention was developed in consideration of the above, and an object of the present invention is to provide a photographing apparatus which enables suppression of a deterioration in image quality which is caused by correction of image information at an image forming apparatus.

In order to achieve the above-described object, the present invention provides a photographing apparatus comprising: a photographing device for photographing a subject; a correction circuit for correcting image information obtained by photographing by the photographing device; an input device for inputting correction information for correcting image information at an image forming apparatus; and a controller which controls the correction circuit such that the image information is corrected in accordance with the correction information inputted by the input device.

The photographic device photographs an object, and the correction circuit corrects the image information obtained by photographing by the photographing device.

The input device inputs correction information for correcting the image information at the image forming apparatus. A recording medium, which can be freely loaded into and removed from the photographing apparatus and on which is recorded image information corrected by the correction circuit and correction information obtained by the image forming apparatus, may be provided. The input device may input correction information from the loaded recording medium.

The controller controls the correction circuit such that the image information is corrected in accordance with the correction information inputted from the input device.

A setting device may be provided which sets a condition for implementing control by the controller. If the condition for implementing set by the setting device is satisfied, the controller controls the correction circuit. In this case, the setting device may set the condition for implementing by selecting one condition for implementing from among a plurality of conditions for implementing control. Further, the correction circuit may correct the image information in accordance with one of correction information set in advance and inputted correction information, and the photographic apparatus may further include a selector for selecting the one of the correction information set in advance and the inputted correction information, and the control device may control the correction circuit such that the image information is corrected in accordance with the correction information selected by the selector.

In this way, at the photographing apparatus, the image information is corrected in accordance with the image correction information for correcting the image information at the image forming apparatus. Thus, the amount of correction of image information carried out at the image forming apparatus can be reduced.

A reduction in the amount of processing carried out at an image forming apparatus can also be achieved by a method of dispersing image information correction processings of the present invention, for dispersing a plurality of image information correction processings for correcting image information obtained by photographing by a photographing apparatus, the method comprising the steps of: carrying out, at a photographing apparatus, at least one image information correction processing among a plurality of image information correction processings; and carrying out, at an image forming apparatus, image information correction processing other than the image information correction processing carried out at the photographing apparatus.

BRIEF DESCRIPTION OF THE DRAWINGS

FIG. 2A is a diagram illustrating an image file structure of a smart media.

FIG. 2B is a diagram illustrating the structure of a region in which print information in FIG. 2A is recorded.

FIG. 3 is a block diagram of a digital still camera.

FIGS. 5A through 5C are diagrams for explaining the flow of setting a setup mode.

FIGS. 7A through 7C are diagrams for explaining a flow of setting the on and off of a learning auto of a manual photography mode.

DESCRIPTION OF THE PREFERRED EMBODIMENT

An embodiment of the present invention will be described hereinafter with reference to the figures.

Figure 1:
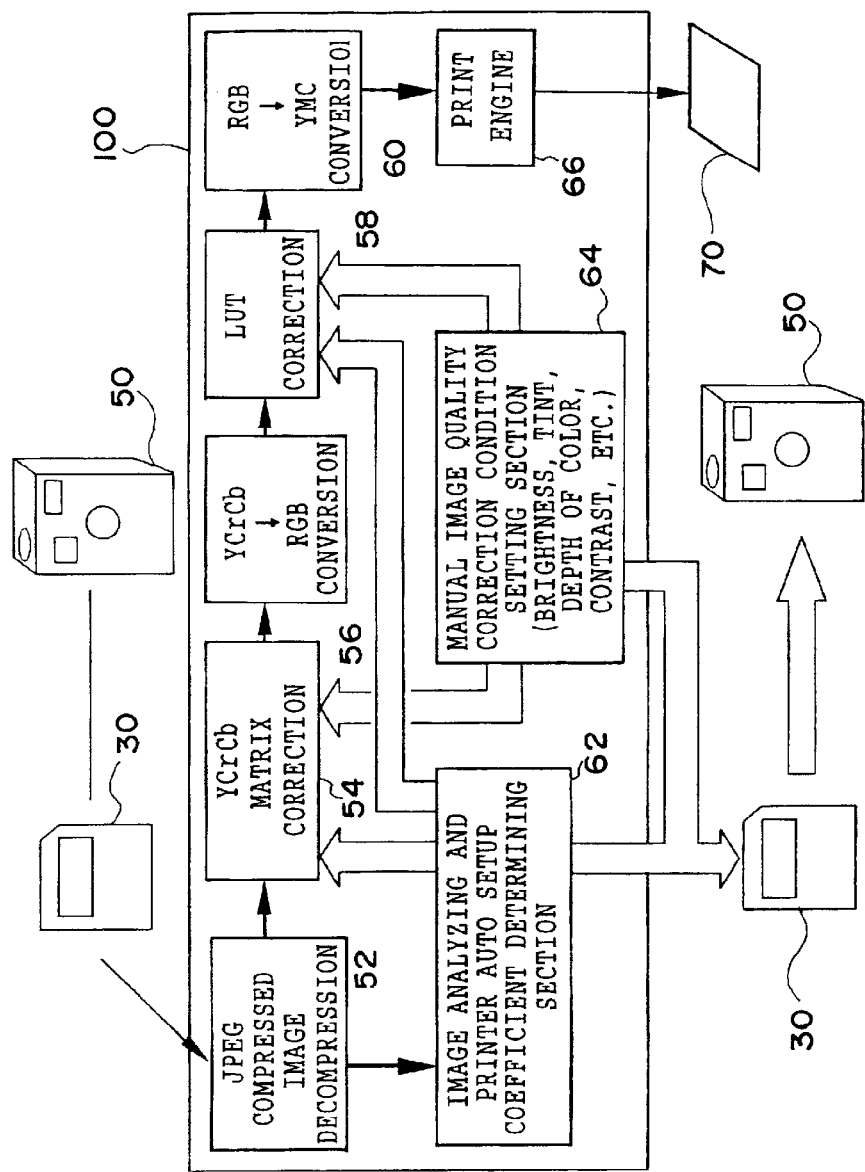
FIG. 1 is a block diagram of a printer.

As illustrated in FIG. 1, a smart media 30, on which information which will be described later is recorded by a digital still camera 50, is loaded into a printer 100. The printer 100 includes a JPEG compressed image decompression circuit 52 which decompresses the image data (a JPEG compressed image) recorded on the smart media 30, a YCrCb matrix correcting circuit 54 which corrects the color correction coefficient of the image data decompressed by the JPEG compressed image decompression circuit 52, an RGB conversion circuit 56 which converts the image data (YCrCb) corrected by the matrix correction circuit 54 into RGB data, a look-up table correction circuit 58 which corrects the image data in order to enhance a predetermined color in accordance with the characteristics of the printer 100, a YMC conversion circuit 60 which converts the image data (RGB data) corrected by the look-up table correction circuit 58 into YMC data, and a print engine 66 which prints the image onto a print 70 on the basis of the image data converted by the YMC conversion circuit 60 (i.e., on the basis of the YMC image data). A printer auto setup coefficient determining section 62 is connected to the JPEG compressed image decompression circuit 52, the YCrCb matrix correction circuit 54, and the look-up table correction circuit 58. The printer auto setup coefficient determining section 62 analyzes the image data decompressed by the JPEG compressed image decompression circuit 52, and sets a color correction coefficient at the YCrCb matrix correction circuit 54, and sets correction information expressing the contents of correction carried out by the look-up-table correction circuit 58. A manual image quality correction condition setting section 64, which sets manual image quality correction conditions (brightness, tint, depth of color, contrast, and the like) inputted from an operation section (not shown), is connected to the YCrCb matrix correction circuit 54 and the look-up table correction circuit 58.

As illustrated in FIG. 2A, an information recording region (image file) 63 of the smart media 30 is divided into a region 63A in which image photographing information (the type of camera, the serial number, flash information, aperture, shutter speed, thumbnail, and the like) is recorded, a region 63B in which print information is recorded, a region 63C in which a reflection mark which expresses that image quality correction has been carried out at the camera is recorded, and a region 63D in which image data is recorded. As illustrated in FIG. 2B, the region 63B in which the print information is recorded is divided into a region 63B1 in which a color balance correction amount is recorded, a region 63B2 in which a brightness correction amount is recorded, a region 63B3 in which a gradation correction amount is recorded, a region 63B4 in which a tint correction amount is recorded, and a region 63B5 in which a contour correction amount is recorded.

Predetermined information is recorded by the digital still camera 50 in the region 63A in which the image photographing information is recorded and the region 63D in which the image data is recorded. The print information is recorded at the printer into the region 63B in which the print information is recorded. The printer 100 records, in the region 63C in which a reflection mark which expresses that image quality correction has been carried out at the camera is recorded, the fact that there is no reflection mark which expresses that image quality correction has been carried out at the camera. The digital still camera records, in the region 63C, the fact that there is a reflection mark which expresses that image quality correction has been carried out at the camera.

As illustrated in FIG. 3, the digital still camera 50 includes a photographing device 10, a correction circuit 12, a conversion circuit 14, a linear matrix circuit 16, a γ conversion circuit 18, a YCrCb conversion circuit 20, a contour correction circuit 22, a YCrCb matrix circuit 24, a compression circuit 26, a driver 28, and a driver 38. The photographing device 10 includes a lens, an infrared ray cutting filter, a low pass filter, and a CCD (all not shown), and serves as the photographing means of the present invention. The correction circuit 12 carries out AE (auto exposure)/AWB (auto white balance) correction on the image signal obtained by a subject being photographed by the photographing device 10. The conversion circuit 14 converts the image signal, whose white balance coefficient and the like have been corrected by the correction circuit 12, into digital image data. The linear matrix circuit 16 corrects the color correction coefficient (matrix coefficient) of the image data which has been converted into digital image data. The γ conversion circuit 18 subjects the image data, whose color correction coefficient has been corrected by the linear matrix circuit 16, to γ correction. The YCrCb conversion circuit 20 converts the image data (RGB data), which has been subjected to γ correction by the γ conversion circuit 18, into YCrCb. The contour correction circuit 22 corrects the contour enhancement coefficient on the basis of the image data (YCrCb data) which is the result of conversion by the YCrCb conversion circuit 20. The YCrCb matrix circuit 24 again corrects the color correction coefficient of the image data whose contour enhancement coefficient has been corrected by the contour correction circuit 22. The compression circuit 26 compresses the image data whose color correction coefficient has been corrected by the YCrCb matrix circuit 24. The driver 28 serves as the input means of the present invention. The driver 28 records, on the smart media 30 which serves as the recording medium of the present invention, image data which has been compressed by the compression circuit 26, and the driver 28 reads and inputs the information recorded on the smart media 30. The driver 38 transmits the image data compressed by the compression circuit 26 to an external device 44 via a digital interface terminal 40 or a wireless communication unit 42.

The correction circuit 12, the γ conversion circuit 18, the contour correction circuit 22, and the YCrCb matrix circuit 24 form the correction means of the present invention.

The digital still camera 50 is provided with a memory 36 which is connected to the YCrCb matrix circuit 24, the driver 28, the driver 38 and an LCD driver 32. The LCD driver 32 is connected to the YCrCb matrix circuit 24 and to an LCD monitor 34. A control circuit 46 is connected to the correction circuit 12, the γ conversion circuit 18, the contour correction circuit 22, the YCrCb matrix circuit 24, and the drivers 28, 38. The control circuit 46 is connected to a cross cursor 82, a mode dial 84, and an execute button 86, which are provided on the back surface of the digital still camera as illustrated in FIG. 4A. The mode dial 84 and the execute button 86 form the setting means and the selecting means of the present invention, respectively.

Figure 4B:
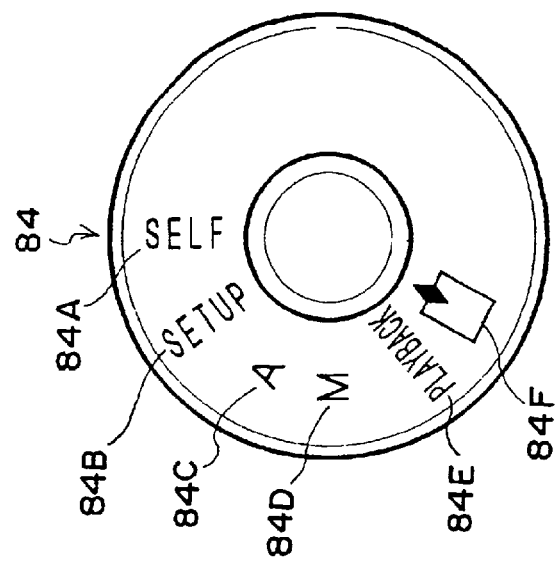
FIGS. 4A and 4B are diagrams illustrating the structure of a rear surface of the digital still camera.
Figure 4A:
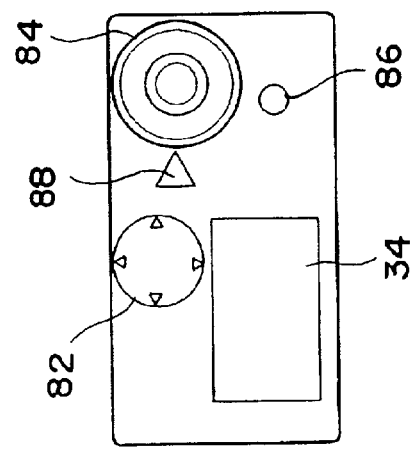

As illustrated FIG. 4B, the mode dial 84 is provided with letters SELF 84A representing the self-timer photographing mode, letters SETUP 84B representing the setup mode, a letter A 84C representing the automatic photographing mode, a letter M 84D representing the manual photographing mode, a word PLAYBACK 84E representing the mode for playing-back the photographed image on the LCD monitor 34, and a symbol 84F representing the connection mode for connection with an external device. The mode which corresponds to a word or the like positioned at a reference position 88 (see FIG. 4A) is set.

Operation of the present embodiment will be described hereinafter.

As illustrated in FIG. 5A, when the mode dial 84 is operated such that the word SETUP 84B is positioned at the reference position 88 and the execute button 86 is turned on, the control circuit 46 which detects this state controls the LCD driver 62 such that the screen of the LCD monitor 84 becomes a setup screen 34G1 illustrated in FIG. 5B. When the cross cursor 82 is operated so that the cursor is positioned at automatic re-learning and the execute button 86 is turned on, a mode is selected in which execute conditions for setting (automatic re-learning) the print information at the respective elements of the digital still camera are selected and set from among a plurality of execute conditions, in order to effect correction at the digital still camera on the basis of the print information. In this way, as illustrated in FIG. 5C, the LCD monitor 34 displays a screen 34G2 for determining the execute conditions for carrying out automatic re-learning.

As shown on the selection screen 34G2 illustrated in FIG. 5C, there are the following four execute conditions for carrying out automatic re-learning: off mode, full automatic, confirm mode, and a plurality of customize modes.

The off mode sets automatic relearning off. In the full automatic mode, automatic re-learning is automatically set when the power is turned on or the smart media is changed. In the confirm mode, when the power is turned on or the smart media is changed, the user can confirm whether the automatic re-learning is to be used. The customize mode allows automatic re-learning to be carried out immediately after the customize mode is selected.

Figure 6:
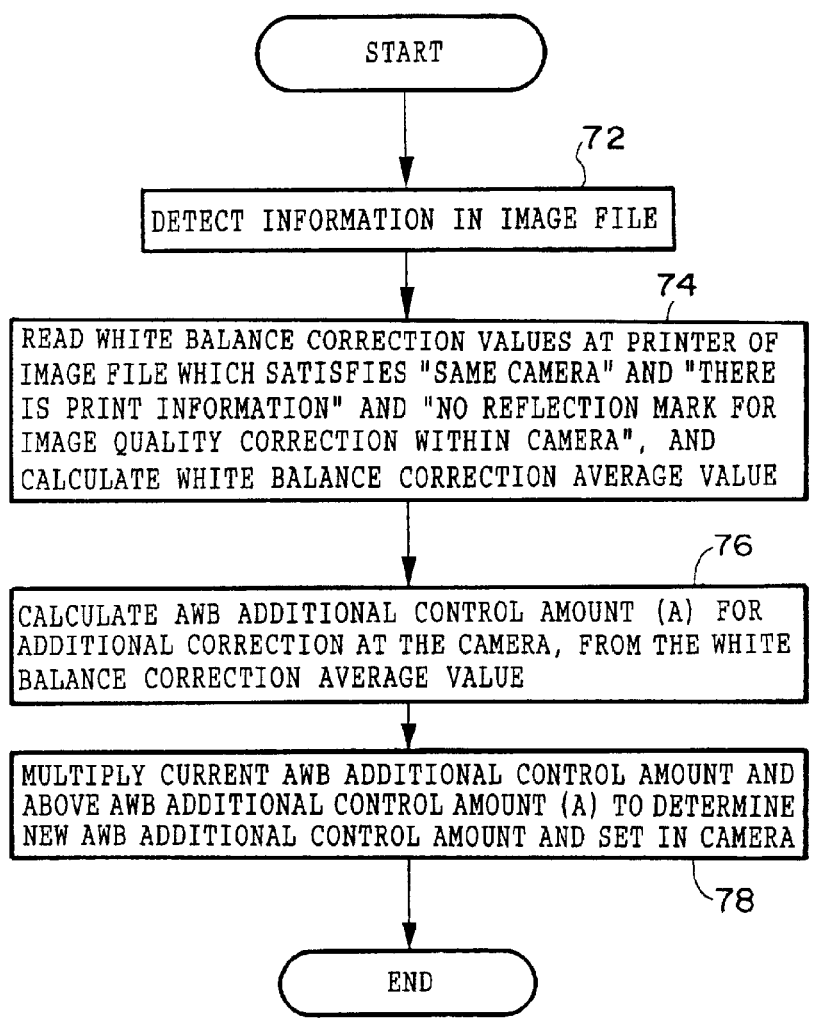
FIG. 6 is a diagram illustrating a print information recording processing routine.

FIG. 6 illustrates a print information setting processing routine which is started when one execute condition (e.g., full automatic) is selected from among the plural execute conditions and the smart media 30 is replaced with a new smart media 30.

In step 72, the information in the image file 63 of the smart media 30 is detected. In step 74, the following processes take place: a determination is made as to whether the following conditions are met: this camera is a camera for which this image file is intended for use, there is print information, and there is no reflection mark which expresses that image quality correction has been carried out at the camera. If there is an image file which satisfies these conditions, the white balance correction amounts are read from the region 63B1 in which the white balance correction amounts are recorded in the region 63B in which print information is recorded. Overall white balance correction average values are computed.

In step 76, AWB additional control amounts (A) for additional correction at the digital camera are calculated from the white balance correction average values. In step 78, the current AWB additional control amounts and the aforementioned AWB additional control amounts (A) are multiplied so as to determine new AWB additional control amounts, and these new amounts are set in the camera (the correction circuit 12). Namely, if the current AWB additional control amounts are $R/G=0.98$ and $B/G=1.02$ and the AWB additional control amounts (A) are $R/G=1.00$ and $B/G=1.07$, then the new AWB additional correction amounts are $R/G=0.98\times1.00=0.98$ $B/G=1.02\times1.07=1.09$.

In other words, setting is carried out such that the R signal and the B signal of the images signals are subjected to a gain adjustment of 0.98 times and 1.09 times, respectively.

In step 78, in addition to the above-described processings, by recording, in the region 63C in which a reflection mark which expresses that image quality correction has been carried out at the camera is recorded, the fact that there is a reflection mark which expresses that image quality correction has been carried out at the camera, redundant setting can be prevented.

In the above-describe routine, white balance correction amounts are used as an example. However, for the other correction amounts as well, processing is carried out in a similar manner, and the corresponding element (the correction circuit 12, the γ conversion circuit 18, the contour correction circuit 22, the YCrCb matrix circuit 24) is set. Namely, the corresponding elements are set on the basis of the print information (brightness correction amount, gradation correction amount, tint correction amount, contour correction amount) read from the region 63B in which print information is recorded in the image file 63 of the smart media 30. For example, on the basis of the brightness correction amount, the AE control amount of the correction circuit 12 is set. On the basis of the gradation correction amount, the γ correction amount of the γ conversion circuit 18 is set. On the basis of the tint correction amount, the matrix correction amount (correction amount of the color correction coefficient) of the YCrCb matrix circuit 24 is set. On the basis of the contour correction amount, the correction amount for correcting the contour enhancement coefficient of the contour correction circuit 22 is set.

In a case in which the off mode is selected, the automatic re-learning is cancelled. If the confirm mode is selected, when the power is turned on or the smart media is changed, the user confirms whether automatic re-learning is to be carried out. When automatic re-learning is set, the above-described processings (steps 72–78) are carried out at that time. When customize is selected, the above-described processings (steps 72–78) are executed immediately at the time that customize is selected.

Due to the above-described processings, thereafter, the image information is corrected by the respective elements (the correction circuit 12, the γ conversion circuit 18, the contour correction circuit 22, the YCrCb matrix circuit 24) in accordance with the set contents.

Namely, the image signal obtained by photographing the subject by the photographing device 10 is subjected to AE/AWB correction at the correction circuit 12 in accordance with the set contents. The image signal which has been corrected by the correction circuit 12 is converted into digital image data by the conversion circuit 14. The color correction coefficient of the image data which has been digitally converted is corrected by the linear matrix circuit 16. The image data whose color correction coefficient has been corrected by the linear matrix circuit 16 is subjected to γ correction by the γ conversion circuit 18 in accordance with the set contents. The image data (RGB data) which has been subjected to γ correction by the γ conversion circuit 18 is converted into YCrCb by the YCrCb conversion circuit 20. The image data (YCrCb data) which has been converted by the YCrCb circuit 20 is subjected to contour correction by the contour correction circuit 22 in accordance with the set contents. The color correction coefficient of the image data, which has been subjected to contour correction by the contour correction circuit 22, is corrected again by the YCrCb matrix circuit 24 in accordance with the set contents. The image data whose color correction coefficient has been corrected by the YCrCb matrix circuit 24 is compressed by the compression circuit 26.

Image data is transferred to the external device 44 via the driver 38 and the digital interface terminal 40 or the wireless communication unit 42, or is recorded on the smart media 30 via the driver 28.

In the present embodiment, the smart media is structured such that image data and print information (information expressing the contents of correction at the printer) can be recorded thereon. The digital still camera in which the smart media is loaded is set such that the image information is corrected in accordance with the print information recorded on the smart media, and the image information is corrected by the set contents. Accordingly, because correction of image information, which was conventionally carried out at the printer, is carried out at the digital still camera (i.e., because the image information correction processings are dispersed), less correction is carried out at printing. Thus, correction of image information at the printer can ultimately be eliminated.

When the mode dial 84 is operated and the letter M 84D is positioned at the reference position 88 and the execute button 86 is turned on, the manual photographing mode is set as described above. When the manual photographing mode is set, the control circuit which senses this setting controls the LCD driver 32 such that the screen of the LCD monitor 34 is set to a manual photographing mode selection screen 34G3 (see FIG. 7B). In this way, the correction coefficient of the white balance can be set manually, the exposure correction can be set manually, and the off/on state of a learning automatic mode can be set manually. Namely, for example, if the cross cursor 82 is operated and the cursor is brought to the learning automatic mode and the execute button 86 is turned on, the screen of the LCD monitor 34 becomes that illustrated in FIG. 7C, which is a screen which allows selection of whether the learning automatic mode is to be turned on or off.

When learning automatic mode on is selected, thereafter, the image information of the respective elements are corrected in accordance with the correction contents set in accordance with the print information. On the other hand, when learning automatic mode off is selected, image information is corrected on the basis of contents set in advance for each element (information at the time the digital still camera is shipped from the factory). In the above-described embodiment, the print information is recorded on the smart media, the print information is read from the smart media, and each element is set. However, the present invention is not limited to the same, and each element may be set by inputting print information direction from the printer.

In the above-described embodiment, although the smart media and the printer are provided in a one-to-one relationship, the present invention is not limited to the same and the following structure is possible. Print information and printer identification information for each of plural printers may be stored in correspondence, and in each printer may be stored printer information corresponding to the identification information identifying that printer. The digital camera may selectively set printer information of the printer in which the smart media of the digital still camera is loaded.

Further, the present invention is not limited to using smart media, and magnetic disks or optical disks may be used.

What is claimed is:

1. A photographing apparatus comprising:
   a photographing device for photographing a subject;
   a correction circuit for correcting image information obtained by photographing by the photographing device;
   an input device for inputting correction information, said correction information for correcting image information received from an image forming apparatus; and
   a controller that controls the correction circuit such that the image information is corrected in accordance with the correction information inputted by the input device, wherein a recording medium, on which image information corrected by the correction circuit and correction information obtained from the image forming apparatus are recorded, can be freely loaded into and removed from the photographing apparatus, and the input device inputs correction information from the recording medium that is loaded in the photographing apparatus.

2. A photographing apparatus according to claim 1, further comprising:
   a setting device for setting a condition for implementing control by the controller, wherein when the condition for implementing set by the setting device is satisfied, the controller controls the correction circuit.

3. A photographing apparatus according to claim 2, wherein the setting device sets the condition for implementing by selecting one condition for implementing from among a plurality of conditions for implementing control.

4. A photographing apparatus according to claim 1, further comprising a selector for selecting the one of the correction information set in advance and the inputted correction information, wherein the correction circuit corrects the image information in accordance with one of correction information set in advance and the inputted correction information, and the controller controls the correction circuit to correct the image information in accordance with the correction information selected by the selector.

5. A photographing apparatus according to claim 1, wherein the input device directly inputs the correction information from the image forming apparatus.

6. A photographing apparatus according to claim 1, wherein the correction circuit carries out at least one of white balance correction, γ correction, contour enhancing correction, and color correction coefficient correction.

7. A photographing apparatus according to claim 1, wherein the input device selectively inputs correction information for correcting the image information from one image forming apparatus among a plurality of image forming apparatuses.

8. An image information correction method of a photographing apparatus, which method corrects image information obtained by photographing a subject by a photographing apparatus, the method comprising the steps of:

inputting correction information for correcting the image information, wherein the correction information is received from an image forming apparatus; and correcting the image information in accordance with inputted correction information, wherein the correction information is inputted from a recording medium that is freely loadable into and removable from the photographing apparatus and on which is recorded image information that has been corrected and correction information obtained from the image forming apparatus.

9. An image information correction method of a photographing apparatus according to claim 8, wherein a condition for implementing correction of the image information is set, and correction is implemented when the set condition for implementing is satisfied.

10. An image information correction method of a photographing apparatus according to claim 8, wherein the condition for implementing is set by selecting at least one condition for implementing from among a plurality of conditions for implementing correction of the image information.

11. An image information correction method of a photographing apparatus according to claim 8, wherein one of correction information set in advance and the inputted correction information is selected, and the image information is corrected according to the selected correction information.

12. An image information correction method of a photographing apparatus according to claim 8, wherein the correction information is inputted directly from the image forming apparatus.

13. A method of dispersing image information correction processings for dispersing a plurality of image information correction processings for correcting image information obtained by photographing by a photographing apparatus, wherein the method comprises:

carrying out, at a photographing apparatus, at least one image information correction processing among a plurality of image information correction processings; and carrying out, at an image forming apparatus, image information correction processing other than the image information correction processing carried out at the photographing apparatus, wherein correction information for correcting image information at the image forming apparatus is inputted to the photographing apparatus, and the photographing apparatus carries out image information correction processing in accordance with the inputted correction information, and the correction information is inputted from a recording medium that is freely loadable into and removable from the photographing apparatus and on which is recorded image information that has been corrected and correction information obtained from the image forming apparatus.

14. A method of dispersing image information correction processings according to claim 13, wherein the correction information is inputted from a recording medium which is freely loaded into and removed from the photographing apparatus and on which is recorded correction information obtained from the image forming apparatus.

15. A method of dispersing image information correction processings according to claim 13, wherein the correction information is directly inputted from the image forming apparatus.

16. A method of dispersing image information correction processings according to claim 13, wherein all of the plurality of image information correction processings are carried out at the photographing apparatus, and image information correction processing at the image forming apparatus is omitted.

17. A method of dispersing image information correction processings according to claim 13, wherein the plurality of image information correction processings include at least two of white balance correction processing, γ correction processing, contour enhancement correction processing, and color correction coefficient correction processing.

* * * * *